United States Patent [19]

Procter, Jr. et al.

[11] Patent Number: 5,550,549

[45] Date of Patent: Aug. 27, 1996

[54] TRANSPONDER SYSTEM AND METHOD

[75] Inventors: James A. Procter, Jr., Indialantic; James C. Otto, Indian Harbour Beach, both of Fla.

[73] Assignee: Harris Corporation, Melbourne, Fla.

[21] Appl. No.: 395,815

[22] Filed: Feb. 28, 1995

[51] Int. Cl.⁶ ........................................... G01S 13/84
[52] U.S. Cl. ..................... 342/47; 342/125; 342/132; 342/134; 342/135
[58] Field of Search ........................ 342/47, 125, 132, 342/134, 135

[56] References Cited

U.S. PATENT DOCUMENTS

| | | | |
|---|---|---|---|
| 3,680,089 | 7/1972 | Sanders | 342/33 |
| 3,889,258 | 6/1975 | Holmes et al. | 342/46 |
| 3,969,725 | 7/1976 | Couvillon et al. | 342/47 |
| 4,128,835 | 12/1978 | Russell | 342/46 |
| 4,275,398 | 6/1981 | Parker et al. | 342/463 |
| 4,287,578 | 9/1981 | Heyser | 367/88 |
| 5,001,486 | 3/1991 | Bachtiger | 342/42 |
| 5,469,173 | 11/1995 | Skudera, Jr. | 342/202 |
| 5,488,662 | 1/1996 | Fox et al. | 380/34 |
| 5,497,160 | 3/1996 | Koehler et al. | 342/145 |

*Primary Examiner*—John B. Sotomayor
*Attorney, Agent, or Firm*—Rogers & Killeen

[57] ABSTRACT

A system and method for determining the range between a receiver of a radio frequency signal and a transmitter of the signal includes transmission of a ranging signal having a grossly timed trigger followed by a chirp waveform. In response to receipt of the leading edge of the grossly timed trigger, the receiver of the ranging signal generates a first reference chirp at about the same time as the expected time of receipt of the chirp waveform, and thereafter compares the two chirps to provide a time correction signal (it being known that when two identical chirp signals, one time delayed from the other, are mixed, the resulting signal will have a frequency proportional to the amount of delay between the two chirp signals.) The time correction signal is used to correct the timing of an outgoing corrected chirp that is to be used to determine range between the transmitter and receiver based on a time of arrival. The corrected signal is received at the transmitter and compared to a further reference chirp that is generated at a known time. The comparison of the received signal to the reference provides a signal related to a time difference between receipt of the corrected signal and the further reference chirp in order to determine a range between the transmitter and the receiver.

22 Claims, 4 Drawing Sheets

5,550,549

TRANSPONDER SYSTEM AND METHOD

BACKGROUND OF THE INVENTION

The present invention is related generally to systems and methods for determining the range between a transmitter of a radio frequency signal and a receiver of the signal, and more particularly to a system and method for determining such range in which the power consumed and the complexity of the system is reduced from conventional systems and methods and in which miniaturization is achievable.

Systems and methods for determining the range between a transmitter and receiver are well known. In some systems, an outbound ranging signal having a known power is transmitted from a base station to a receiver at an unknown distance. The receiver may respond to the ranging signal by transmitting a return signal upon receipt of the ranging signal. The range may be determined, for example, by computing the total transit time from transmission of the ranging signal to receipt of the return signal whereby the distance may be computed, or by measuring the power of the return signal whereby an estimate of distance may be computed using the inverse square law of signal strength over increasing distances.

There are two general methods of generating the return signal. The "bent pipe" approach includes a return signal that is an echo of the ranging signal transmitted on a different frequency than the ranging signal. While implementation is generally simple and miniaturization is feasible, the transmit power of the ranging signal can be high and the antenna diplexer for the second frequency can be difficult to build. Further, the range of such systems is generally limited when the signal-to-noise ratio of the ranging signal is negative because the signal-to-noise ratio of the return signal is much more negative. In addition, two frequency bands must be allocated when single band operation is more desirable.

In the "time of arrival" approach the actual time of arrival of the ranging signal is determined and a separate return signal is transmitted on the same frequency. These systems require less power than "bent pipe" systems and provide better performance. However, they are complex and more difficult to miniaturize.

Accordingly, it is an object of the present invention to provide a novel system and method for determining range between a transmitter and a receiver that obviates the problems of the prior art.

It is another object of the present invention to provide a novel system and method for determining range between a transmitter and a receiver in which a ranging signal includes a trigger for activating a reference chirp at a receiver that is compared to a chirp waveform in the ranging signal so that an accurately timed return signal can be generated.

It is yet another object of the present invention to provide a novel system and method for determining range between a transmitter and a receiver in which the timing of a grossly timed return signal is corrected before transmission.

It is still another object of the present invention to provide a novel system and method for determining range between a transmitter and a receiver in which a ranging signal includes a grossly timed trigger for activating a reference chirp that is used to provide a correction signal for correcting the timing of the return signal from the receiver so that the arrival time of the return signal may be used to determine range.

It is a further object of the present invention to provide a novel system and method for determining range between a transmitter and a receiver in which the return signal is compared to a further reference chirp at the transmitter, the timing of the further reference chirp being related to a predetermined range from the transmitter.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
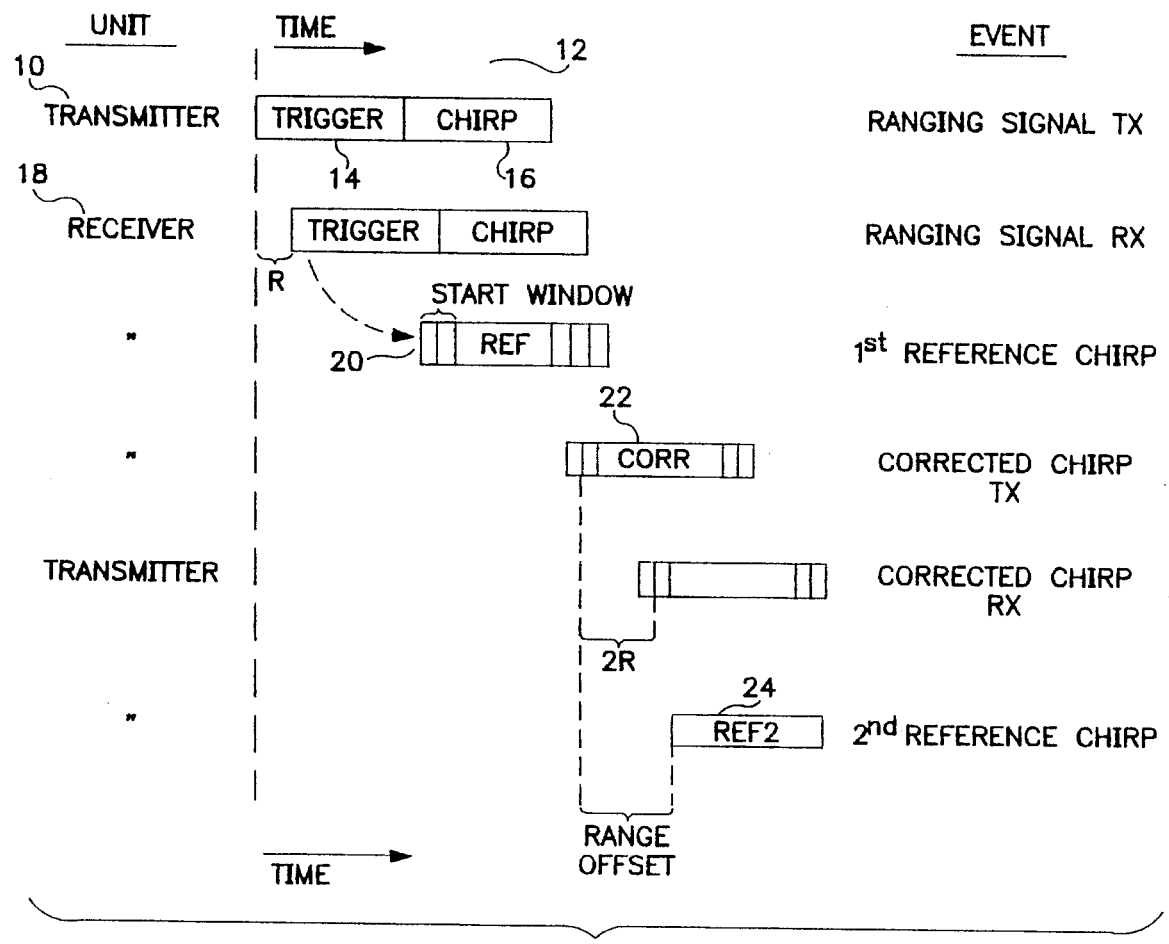
FIG. 1 is a flow diagram of the sequence of events in the operation of an embodiment of the present invention.
Figure 2:
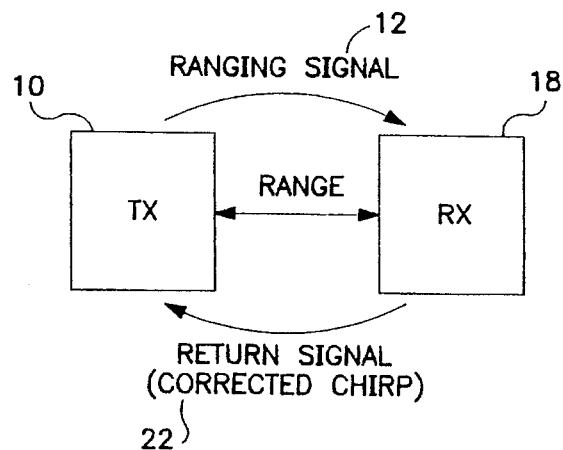
FIG. 2 is a schematic diagram of operation of an embodiment of the present invention.

With reference now to FIGS. 1 and 2, in an embodiment of the present invention a transmitter 10 at a first location attempting to determine the range to a receiver at a second location may transmit a ranging signal 12 having a first portion that is a trigger 14 and a second portion that is a chirp waveform 16. The trigger 14 may be gross timing waveform that will be used to start a reference chirp at a receiver 18. The trigger 14 is desirably a crude preamble for the ranging signal. The trigger 14 is intended to be a rough indicator of time, not suitable for determining time of arrival to the desired accuracy (such unsuitability being denoted by the phrase "gross timing"), and may be detected with a simple demodulator. The start of the chirp waveform 16 may be suitable for use in determining the round trip time of flight [time of arrival] in subsequent calculations and thus the range.

Upon receipt of the trigger 14, a receiver 18 generates a reference chirp 20 at about the same time as the chirp waveform 16 in the ranging signal is to be received. The timing of the reference chirp 20 need not be exact as indicated by the start window in FIG. 1 (indeed, the reference chirp 20 can only be as exact as the trigger 14 that initiates it). The reference chirp 20 and the chirp waveform 16 may be compared to produce a correction signal indicative of the time difference between the reference chirp 20 and the chirp waveform 16. This time difference may be represented by the frequency of the correction signal.

The receiver 18 generates a new chirp for transmission to a receiver at the same location as the transmitter 10. The generation of the new chirp is initiated in response to receipt of the (inaccurately timed) entire trigger and is therefore not accurate enough for use in range determinations. The new chirp is modified by application of the correction signal to thereby produce a corrected chirp for transmission as a return signal. The corrected chirp allows the transmitter 10 to determine the range to the receiver 18 using a time of arrival of the corrected chirp 22 and the round trip time of flight.

The transmitter 10 may generate a second reference chirp 24 at a predetermined time after transmission of the ranging signal 12. For example the second reference chirp 24 may be offset by a time related to a predetermined range, such as the maximum range of the system. Upon receipt of the corrected chirp 22 (now accurately timed) at the transmitter 10, the corrected chirp 22 is compared to the reference chirp 24 to produce a signal having a frequency indicative of the time difference which represents the time delay of the receiver and the time of arrival of the corrected chirp and which may be used to determine range between the transmitter and the receiver 18.

Use of a chirp waveform has several advantages in the present invention because of a useful property of chirp signals. It is known that when two identical chirp signals, one time delayed from the other, are mixed, the resulting signal will be a sinusoidal signal with a frequency that is proportional to the amount of delay between the two chirp signals.

In a preferred embodiment, the chirp waveform 16, and the first reference chirp 20 are the same, and the corrected chirp 22, and the second reference chirp 24 are the same. Thus, the comparison of the chirp waveform 16 to the first reference chirp 20 produces a signal that may be used to produce the corrected chirp 22. Further, the comparison of the corrected chirp 22 to the second reference chirp 24 produces a signal that is indicative of the time delay between the range offset (which is known) and receipt of the corrected chirp so that the range to the receiver may be determined conventionally.

This process may be repeated so that the range may be determined frequently. In a preferred embodiment a new ranging signal 12 may be transmitted from the transmitter 10 after receipt of the corrected chirp 22, or after a period sufficient for receipt of a corrected chirp 22 from a predetermined (e.g., maximum) range. The calculation of range in an appropriate processor may take place between receipt of corrected chirps.

Figure 3:
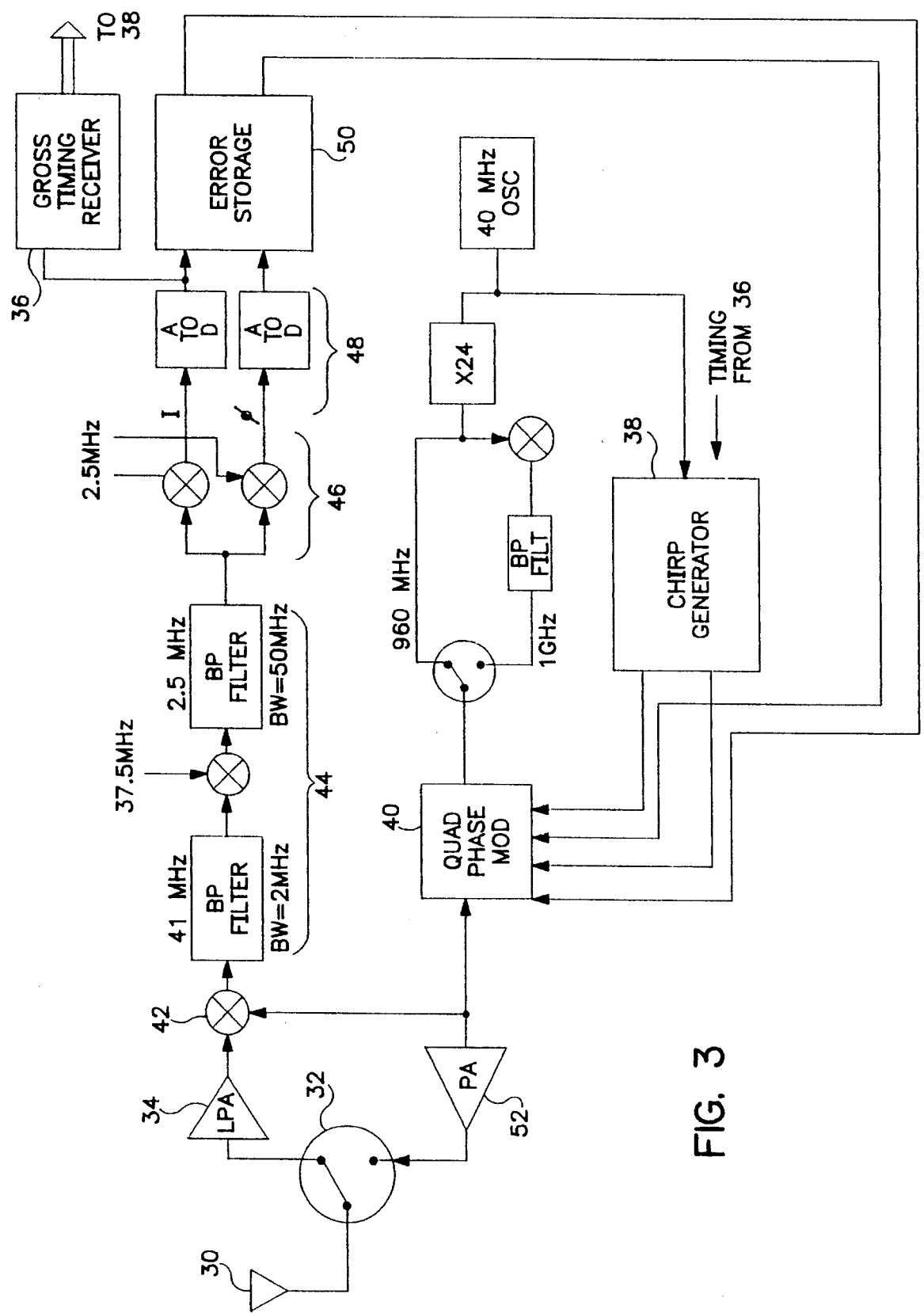
FIG. 3 is a block diagram of an embodiment of the receiver of the present invention.

With reference now to FIG. 3, an embodiment of the receiver 18 may include an antenna 30 for receiving the ranging signal. The received signal may be provided through a transmit/receive switch 32 to a low noise amplifier 34. The trigger (e.g., gross timing waveform) portion of the ranging signal may be received at receiver 36 which provides a signal to chirp generator 38 for initiating the first reference chirp that is desirably the same as the chirp waveform in the ranging signal. The receiver 36 is desirably a simple demodulator that does not consume significant power and is easy to miniaturize and is discussed below in relation to FIG. 5. Because the gross timing receiver can be imprecise, a relatively narrow band trigger signal can be used. Because the trigger signal is a low chirp rate spread spectrum signal, a low clock rate correlator can be used as a matched filter to detect it. This low clock rate results in a simple implementation and low power.

The reference chirp and the chirp waveform portion of the ranging signal may be mixed with a quadrature modulator 40 and mixer 42 to provide a correction (e.g., band pass) signal that has a frequency proportional to the time difference between the two chirps. The correction signal may be filtered in filter 44 to improve the signal-to-noise ratio of the correction signal. The correction signal may be downconverted to an intermediated frequency in converter 46, digitized in analog-to-digital converter 48, and stored in a digital delay store 50.

After the incoming chirp waveform of the ranging signal has been received, the chirp generator 38 generates a new chirp signal [that is to be transmitted to the transmitter 10]. The new chirp is generated responsive to receipt of the entire trigger and thus may include a timing error. The chirp signal may be mixed with the correction signal that has been retrieved from the store 50 to thereby cancel the timing errors in the new chirp (caused by the trigger) whereby a corrected chirp is produced. The corrected chirp is then amplified and transmitted as a return signal to the transmitter. The frequency of the ranging signal and the return signal are desirably the same to obviate the need for additional frequency allocation. If there are any frequency offsets between the chirp waveform in the ranging signal and the chirp from the chirp generator 38, they too will be corrected by the correction signal from the store 50. As will be appreciated, the signal-to-noise ratio of the corrected chirp (return signal) is improved by the filter 44.

Figure 4:
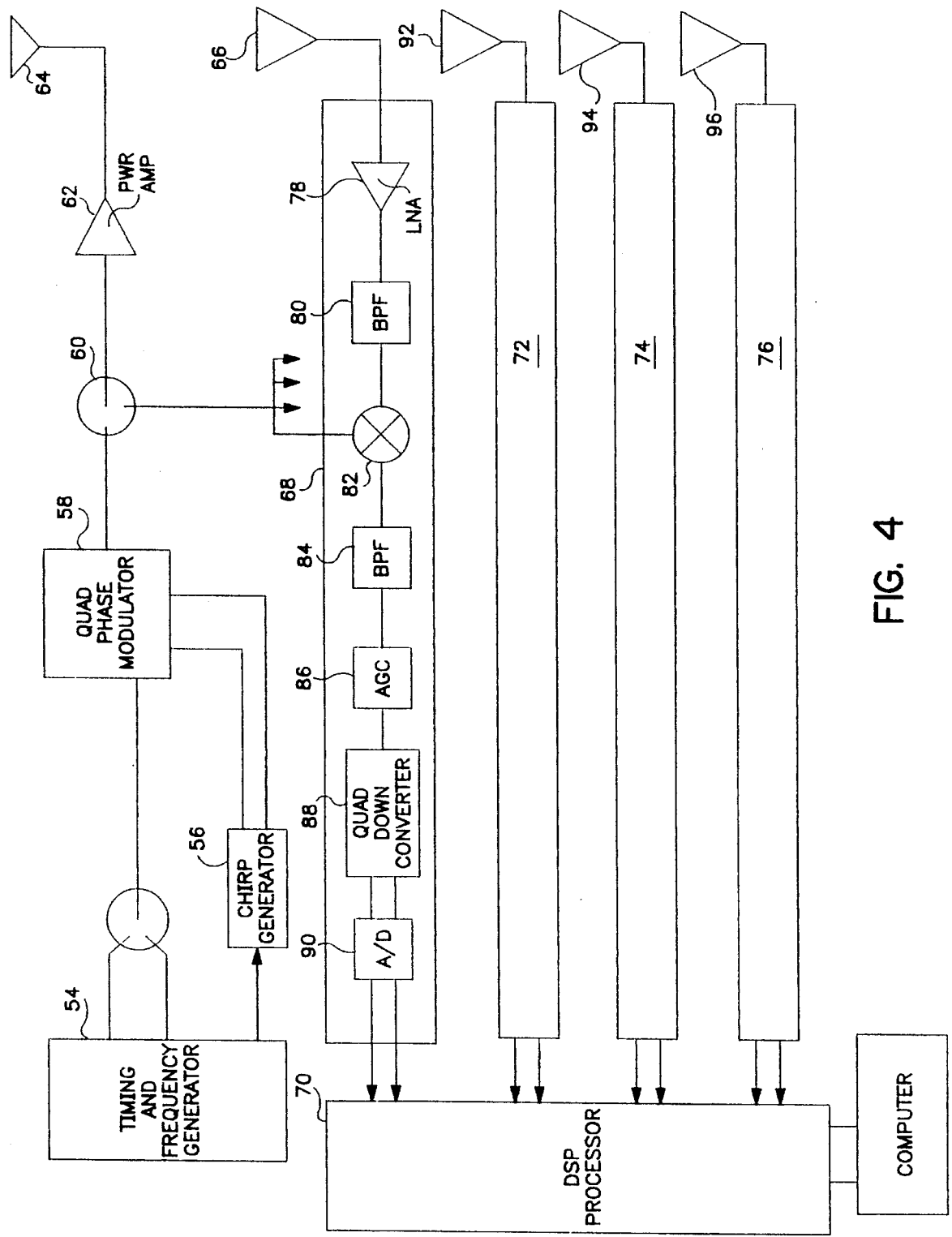
FIG. 4 is a block diagram of an embodiment of the transmitter of the present invention.

With reference now to FIG. 4, an embodiment of the transmitter may include a timing and frequency generator 54 for tracking a transmit and receive cycle. At the appropriate time the timing and frequency generator 54 signals the chirp generator 56 to generate a chirp waveform. The chirp waveform is modulated by the quadrature phase modulator 58 to thereby produce a ranging signal. The ranging signal is passed through a transmit/receive switch 60 and a power amplifier 62 to a transmit antenna 64 where the ranging signal is transmitted to the receiver.

After processing the ranging signal, the receiver transmits the return signal to a receiver at the transmitter location as previously described. With continued reference to FIG. 4, the receiver at the transmitter location may include a receive antenna 66, a receive channel 68 and a digital processor 70. In the preferred embodiment, the receiver includes multiple receive channels 68, 72, 74, 76 each associated with a different receive antenna 66, 92, 94, 96.

Each of the antennas receives the return signal and passes it to the respective receive channel. Each of the receive channels may include a mixer 82 for mixing the return signal with a chirp waveform produced by the chirp generator 56 to thereby produce a narrow band sinusoidal signal the frequency of which is proportional to the time of arrival of the return signal. The reference chirp may be generated at a predetermined time after transmission of the ranging signal. For example, the reference chirp may be offset by a time related to a predetermined range, such as the maximum range of the system.

In the preferred embodiment, each receive channel 68, 72, 74, 76 may include a low noise amplifier 78 for amplifying the return signal, a band pass filter 80 for improving the signal-to-noise ratio of the return signal, a mixer 82 for mixing the return signal with a chirp waveform to produce a sinusoidal signal as previously describe, a second band pass filter 84 for improving the signal-to-noise ratio of the sinusoidal signal, a variable gain amplifier for producing a sinusoidal signal with a constant amplitude independent of the return signal, a quadrature downconverter 88 for down converting the sinusoidal signal, and an analog-to-digital converter 90 for digitizing the sinusoidal signal. Each sinusoidal signal output from each receive channel is passed to the digital processor 70 for spectral analysis followed by time-of-arrival analysis and AOA processing as is known in the art. Thereafter the results are displayed for the user.

Figure 5:
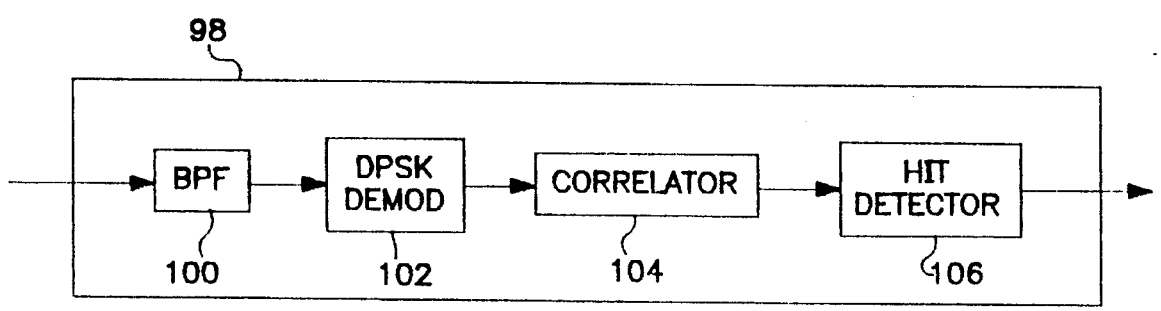
FIG. 5 is a block diagram of an embodiment of the gross timing receiver of the present invention.

With reference now to FIG. 5, the gross timing receiver 98 may include a band pass filter 100 for filtering the digital signal and a differential phase shift keyed demodulator 102 for producing a 128 chip long pseudo-noise sequence. The sequence is then passed to a matched correlator 104 and a hit detector 106 for determining when the trigger portion of the ranging signal has arrived. When a hit is detected, the hit detector 106 initiates the receive cycle by generating the reference chirp within a 7.3 micro second window of the time of arrival of the chirp waveform portion of the ranging signal.

In the foregoing, for ease of understanding, the elements of the system have been referred to as a transmitter and a receiver although other terms such as "base station" and "remote station" are equally applicable. Either or both of these elements may be mobile. In one embodiment the ranging and return signals operated at a frequency of 912 Mhz and the chirp operated from 902 Mhz to 922 Mhz for 10 milliseconds.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of determining range between a receiver of a radio frequency signal and a transmitter of the signal, the method comprising the steps of:
   (a) transmitting at a transmitter a ranging signal having a gross timing waveform portion followed by a chirp waveform;
   (b) generating at a receiver of the ranging signal a first reference chirp;
   (c) comparing the first reference chirp to the chirp waveform portion of the ranging signal to provide a correction signal indicating a time difference between receipt of the chirp waveform and generation of the first reference chirp;
   (d) transmitting from the receiver a corrected chirp that incorporates the correction signal; and
   (e) comparing the corrected chirp received at the transmitter to a second reference chirp generated at the transmitter to determine a range between the transmitter and the receiver.

2. The method of claim 1 wherein generation of the first reference chirp commences at about the same time as the chirp waveform portion of the ranging signal is received at the receiver.

3. The method of claim 2 wherein a gross determination of receipt of a front end of the gross timing waveform initiates generation of the first reference chirp.

4. The method of claim 1 wherein the correction signal comprises band pass signal with a frequency proportional to the time difference between receipt of the chirp waveform and generation of the first reference chirp.

5. The method of claim 4 wherein the correction signal further comprises information about an environment through which the ranging signal has passed.

6. The method of claim 1 wherein the second reference signal is generated so that it commences at a time corresponding to a predetermined maximum range between the receiver and the transmitter.

7. The method of claim 1 wherein the chirp waveform and the corrected chirp are about ten milliseconds long.

8. The method of claim 1 wherein the comparison of the corrected chirp received at the transmitter to the second reference chirp produces a beat note having a frequency related to the range between the receiver and the transmitter.

9. The method of claim 1 further comprising the step of delaying the correction signal before incorporating the correction signal into the corrected chirp.

10. The method of claim 1 wherein the chirp waveform in the ranging signal and the corrected chirp are transmitted on the same frequency.

11. A system for determining range between a receiver of a radio frequency signal and a transmitter of the signal, the system comprising:
   a transmitter for transmitting a ranging signal having a gross timing waveform portion followed by a chirp waveform;
   a receiver for receiving said ranging signal, said receiver comprising,
      (i) means for generating a first reference chirp,
      (ii) means for comparing said first reference chirp to said chirp waveform portion of said ranging signal to provide a correction signal indicating a time difference between receipt of said chirp waveform and generation of said first reference chirp,
      (iii) means for generating a corrected chirp that incorporates said correction signal, and
      (iv) means for transmitting said corrected chirp; and said transmitter comprising,
      (i) means for receiving said corrected chirp,
      (ii) means for generating a second reference chirp, and
      (iii) means for comparing said corrected chirp to said second reference chirp to determine a range between the transmitter and the receiver.

12. The system of claim 11 wherein said means for generating said first reference chirp is responsive to receipt of a front end of said gross timing waveform, whereby said first reference chirp commences at about the same time as said chirp waveform portion is received at said the receiver.

13. The system of claim 11 wherein said means for generating said first reference chip comprises a band pass filter for providing said correction signal with a frequency proportional to a time difference between receipt of said chirp waveform and generation of said first reference chirp.

14. The system of claim 11 wherein said means for generating said second reference signal generates said second reference signal at a time corresponding to a predetermined maximum range between said receiver and said transmitter.

15. The system of claim 11 wherein said means for generating said corrected chirp comprises delay means for delaying said correction signal before incorporating said correction signal into said corrected chirp.

16. The system of claim 11 wherein said chirp waveform in said ranging signal and said corrected chirp are transmitted on the same frequency.

17. A method of determining range between a receiver of a radio frequency signal and a transmitter of the signal, the method comprising the steps of:
   (a) transmitting at a transmitter a ranging signal having a grossly timed trigger followed by a chirp waveform;
   (b) responsive to receipt of the trigger, generating at a receiver of the ranging signal a first reference chirp at about the same time as receipt of the chirp waveform;
   (c) comparing the first reference chirp to the chirp waveform to provide a correction signal for correcting a return signal from the receiver, the correction being related to a time difference between receipt of the chirp waveform and generation of the first reference chirp; and
   (d) evaluating the return signal received at the transmitter to determine a range between the transmitter and the receiver.

18. The method of claim 17 further comprising the steps of providing a second reference chirp at the transmitter and measuring a time difference between the second reference chirp and the received return signal.

19. The method of claim 18 further comprising the steps of generating the second reference chirp at a time related to a predetermined distance from the transmitter.

20. A range finding system comprising:

- a base station for transmitting a ranging signal having a chirp waveform;
- a remote station for receiving the ranging signal and for transmitting a return signal having a corrected chirp, where the frequency of the corrected chirp represents the time delay of the remote station, without determining the time of arrival of the ranging signal.

21. A method of determining range between a base station and a remote station comprising the steps of:

a) transmitting from the base station a ranging signal having a chirp waveform;

b) receiving the ranging signal at the remote station;

c) transmitting from the remote station a return signal having a corrected chirp, where the frequency of the corrected chirp represents the time delay of the remote station, without determining the time of arrival of the ranging signal.

22. A method of determining range between a base station and a remote station comprising the steps of:

a) transmitting a ranging signal from the base station to the remote station where the ranging signal comprises a gross timing signal followed by a chirp waveform;

b) at the remote station, generating a reference chirp in response to receipt of the gross timing signal;

c) mixing the chirp waveform with the reference chirp to thereby produce a correction signal having a frequency proportional to the time difference between the chirp waveform and the reference chirp;

d) mixing the correction signal with a new chirp to thereby produce a corrected chirp having a frequency representative of the correction signal;

e) transmitting the corrected chirp to the base station;

f) mixing the corrected chirp with a second reference chirp to thereby produce a time delay signal having a frequency that represents the time delay in the remote station and the time of arrival of the corrected chirp whereby the time delay signal and the round trip time of flight is used to calculate the range between the base station and the remote station.

* * * * *